United States Patent
Whitney et al.

(10) Patent No.: US 10,766,780 B2
(45) Date of Patent: Sep. 8, 2020

(54) BORON NITRIDE NANOTUBE VIBRATION DAMPING

(71) Applicant: BNNT, LLC, Newport News, VA (US)

(72) Inventors: R. Roy Whitney, Newport News, VA (US); Thomas G. Dushatinski, Chesapeake, VA (US); Thomas W. Henneberg, Newport News, VA (US); Kevin C. Jordan, Newport News, VA (US); Diego Pedrazzoli, Newport News, VA (US); Jonathan C. Stevens, Williamsburg, VA (US); Michael W. Smith, Newport News, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

(21) Appl. No.: 16/204,017

(22) Filed: Nov. 29, 2018

(65) Prior Publication Data

US 2019/0092643 A1    Mar. 28, 2019

Related U.S. Application Data

(63) Continuation of application No. PCT/US2018/017231, filed on Feb. 7, 2018.

(Continued)

(51) Int. Cl.
*C01B 35/14* (2006.01)
*F16F 15/00* (2006.01)
(Continued)

(52) U.S. Cl.
CPC ........ *C01B 35/146* (2013.01); *C01B 21/0648* (2013.01); *F16F 9/00* (2013.01);
(Continued)

(58) Field of Classification Search
None
See application file for complete search history.

(56) References Cited

U.S. PATENT DOCUMENTS

| | | | | |
|---|---|---|---|---|
| 8,709,538 B1 * | 4/2014 | Cumberland | ......... | F28F 13/185 427/248.1 |
| 8,734,748 B1 * | 5/2014 | Hung | ................. | C01B 21/0648 423/276 |

(Continued)

OTHER PUBLICATIONS

Mingo et al.; First-Principles Calculation of the Isotype Effect on Boron Nitride Nanotube Thermal Conductivity; Nano Letters; vol. 9, No. 1, pp. 81-84; 2009.*

(Continued)

*Primary Examiner* — Guinever S Gregorio
(74) *Attorney, Agent, or Firm* — Joshua B. Brady; Nixon & Vanderhye, P.C.

(57) ABSTRACT

As disclosed herein, the viscoelastic performance of boron nitride nanotube (BNNT) materials may be enhanced and made into useful formats by utilizing purified BNNTs, aligned BNNTs, isotopically enhanced BNNTs, and density controlled BNNT material. Minimizing the amounts of boron particles, a-BN particles, and h-BN nanocages, and optimizing the h-BN nanosheets has the effect of maximizing the amount of BNNT surface area present that may interact with BNNTs themselves and thereby create the nanotube-to-nanotube friction that generates the viscoelastic behavior over temperatures from near absolute zero to near 1900 K. Aligning the BNNT molecular strands with each other within the BNNT material also generates enhanced friction surfaces. The transport of phonons along the BNNT molecules may be further enhanced by utilizing isotopically enhanced BNNTs.

20 Claims, 7 Drawing Sheets

Related U.S. Application Data

(60) Provisional application No. 62/455,924, filed on Feb. 7, 2017.

(51) Int. Cl.
  *F16F 9/00* (2006.01)
  *C01B 21/064* (2006.01)
  *F16F 9/30* (2006.01)
  *B82Y 30/00* (2011.01)
  *B82Y 40/00* (2011.01)

(52) U.S. Cl.
  CPC .............. *F16F 9/306* (2013.01); *F16F 15/00* (2013.01); *B82Y 30/00* (2013.01); *B82Y 40/00* (2013.01); *C01P 2004/13* (2013.01); *C01P 2006/10* (2013.01); *C01P 2006/12* (2013.01); *C01P 2006/22* (2013.01); *C01P 2006/90* (2013.01)

(56) References Cited

U.S. PATENT DOCUMENTS

| | | | |
|---|---|---|---|
| 2012/0085970 A1 | 4/2012 | Zhang et al. | |
| 2014/0217693 A1 | 8/2014 | Schmidt et al. | |
| 2017/0044016 A1* | 2/2017 | Smith | H01L 21/00 |

OTHER PUBLICATIONS

Tiano et al.; Boron Nitride Nanotube: Synthesis and Applications; Nanosensors, Biosensors, and Info-Tech Sensors and Systems; Proc. of SPIE, vol. 9060, 906006-1; 2014.*

International Search Report and Written Opinion of the ISA for PCT/US2018/017231, dated Mar. 28, 2018, 15 pages.

Hong et al., Strong viscous behavior discovered in nanotube mats, as observed in boron nitride nanotube mats, Composites Part B, vol. 91, Feb. 8, 2016, retrieved Mar. 13, 2018, Retrieved from the Internet: <URL: https://pdfs.semanticscholar.org/ba63/afeeecba9dc121b4c71625f5a0942244d862.pdf, pp. 56-64.

Islam et al., Characterization of Carbon Fiber Reinforced Epoxy Composites Modified with Nanoclay and Carbon Nanotubes, Procedia Engineering, vol. 105, 2015, retrieved Mar. 14, 2018, retrieved from the Internet: <URL:https://ac.els-cdn.com/S1877705815008759/1-s2.0-S1877705815008759-main.pdf?_tid:9b94e13b-400c-46a3-b3af-1bdfbc3000af &acdnat=1521215859_72ca270e12acadfde8d5b0c07cf0ac1c. , pp. 821-828.

Agrawal et al., "Nanoscale Damping Characteristics of Boron Nitride Nanotubes and Carbon Nanotubes Reinforced Polymer Composites," American Chemical Society Applied Materials & Interfaces, Oct. 29, 2013, XP002790861, pp. 12052-12057.

Chen et al., "Purification of boron nitride nanotubes," Chemical Physics Letters, Elsevier BV, NL, vol. 425, No. 4-6, Jul. 10, 2006, XP027876667, pp. 315-319.

* cited by examiner

BORON NITRIDE NANOTUBE VIBRATION DAMPING

This application is a Continuation of International Application No. PCT/US2018/017231 filed Feb. 7, 2018, which claims the benefit of U.S. Provisional Patent Application No. 62/455,924, filed Feb. 7, 2017, the entire contents of each of which are incorporated herein by reference.

CROSS REFERENCE TO RELATED APPLICATIONS

This application claims the benefit of U.S. Provisional Patent Application No. 62/455,924, filed Feb. 7, 2017, the entirety of which is incorporated herein by reference.

STATEMENT REGARDING GOVERNMENT SUPPORT

None.

FIELD OF THE INVENTION

The present disclosure relates to methods of enhancing the viscoelastic properties of boron nitride nanotubes (BNNTs) for vibration damping.

BACKGROUND

Passive vibration damping occurs when vibrational energy is converted into heat in a viscoelastic material, a fluid, or a gas. Common examples of passive vibration damping include rubber washers (viscoelastic material) used in attaching motors to their frames and shock absorbers (fluid) in a vehicle. One disadvantage with most materials used for passive viscoelastic vibration damping is that they only perform well in a narrow range of temperatures. For example, rubber washers typically become rigid at temperatures below zero degrees centigrade and will degrade and/or burn at temperatures at/above several hundred degrees centigrade. Nevertheless, viscoelastic materials are usually preferred for vibration damping because they: 1) have only the motions associated with the vibrations; 2) have no moving fluids or gases; and 3) require no electrical controls and power associated with active vibration damping. There exists a need for improved viscoelastic materials having applicability in a wide temperature range.

SUMMARY

BNNTs have exceptional viscoelastic behavior, and BNNT material may be processed into desired configurations for use as a vibration damping material. Advantageously, the viscoelastic performance of BNNT material may be enhanced through, for example, purifying the BNNT material, aligning BNNTs in the material, isotopically enhancing the BNNT material, controlling the density of the BNNT material, and combinations thereof. Minimizing the amount of boron particles, a-BN particles, h-BN nanocages, and h-BN nanosheets in a BNNT material maximizes the amount of BNNT surface area present and thereby improves the nanotube-to-nanotube friction that generates the viscoelastic behavior. Aligning BNNT molecular strands with each other within the BNNT material also generates enhanced friction surfaces. The transport of phonons along the BNNT molecules may be further enhanced by utilizing isotopically enhanced BNNTs. In particular, both $^{10}$B and $^{11}$B isotope enhancements to BNNT material improve phonon transport along the nanotube structures. It should be appreciated that a visco-elastically-enhanced BNNT material may include one or more enhancements to increase and/or direct the material's visco-elastic parameters.

An important characteristic of viscoelastic materials is their storage modulus, i.e. stiffness. Selection of synthesis parameters of the visco-elastically-enhanced BNNT material and the assembly processes going into making BNNT mats may be tailored to adjust the storage modulus of the final mat. For example, if high pressures are used in compressing the BNNT material into the mats, then the storage moduli are higher. If the BNNT material is aligned or/or woven into select geometries, the storage moduli may be either raised or lowered, depending on the geometries.

The BNNT molecular strands that form the visco-elastically-enhanced BNNT material may be made into threads and yarns that may incorporate multiple threads that, in turn, may be made into ropes and fabrics. The alignment of the BNNT molecular strands may be enhanced with these different forms thereby enhancing the mechanical resilience of the final BNNT mat and enhancing the viscoelastic properties for vibration damping.

The present disclosure relates to a vibration damper that includes a visco-elastically-enhanced BNNT material. The visco-elastically-enhanced BNNT material may include: (1) an as-synthesized BNNT material that has been purified to reduce an amount of at least one of boron particles, a-BN particles, h-BN nanocages, and h-BN nanosheets; (2) an isotopically-enhanced BNNT material; and/or (3) a BNNT compressed material. In some embodiments, the isotopically-enhanced BNNT material may include an enhanced concentration of $^{10}$B and/or $^{11}$B. In some embodiments, the compressed BNNT material has a compressed density of about 1 to 3 orders of magnitude greater than the density of an as-synthesized BNNT material. In some embodiments, the visco-elastically-enhanced BNNT material includes at least one of a BNNT thread, a BNNT yarn, a BNNT mat, and a BNNT fabric. The visco-elastically-enhanced BNNT material may include a plurality of BNNT mats and/or a plurality of stacked BNNT mats. In some embodiments, the plurality of stacked BNNT mats may be compressed.

The present disclosure also relates to methods of forming a vibration damper having a BNNT material. The method may include visco-elastically enhancing the BNNT material through at least one of: purifying the BNNT material; aligning BNNTs in the BNNT material; isotopically enhancing the BNNT material; increasing the density of the BNNT material; and increasing the alignment of BNNT strands relative to the direction of vibration. In some embodiments, the method of purifying the BNNT material includes at least partially removing from the BNNT material at least one of boron particles, a-BN particles, h-BN nanocages, and h-BN nanosheets. In some embodiments, the method of aligning BNNTs in the BNNT material includes forming at least one of a BNNT yarn and a BNNT thread. In some embodiments, isotopically enhancing the BNNT material comprises enhancing the presence of $^{10}$B and/or $^{11}$B. In some embodiments, increasing the density of the BNNT material includes one of: (1) compressing the BNNT material, and (2) dispersing the BNNT material in a dispersant and separating the dispersed BNNT material on to a filter membrane, and evaporating a dispersant from BNNTs placed into a desired geometry. In some embodiments, the dispersant is an alcohol such as methanol, ethanol or isopropyl alcohol. In some embodiments, a BNNT thread and/or a BNNT yarn is made into at least one of a rope and a fabric. The method of forming a vibration damper having a BNNT material may further include compressing the BNNT thread and/or BNNT yarn. The method may include forming a plurality of BNNT mats and stacking the plurality of BNNT mats. The method may also include wrapping the BNNT yarn around a mandrill to form a cylindrical BNNT mat. The method may also include weaving a BNNT thread or a BNNT yarn into a BNNT fabric.

The present disclosure also relates to a vibration damping system that includes a housing containing a visco-elastically-enhanced BNNT material. In some embodiments of the vibration damping system, the BNNT material includes at least one of a purified BNNT material, an isotopically-enhanced BNNT material, a compressed BNNT material, a BNNT mat, a BNNT yarn, and a BNNT thread.

DETAILED DESCRIPTION

Figure 1:
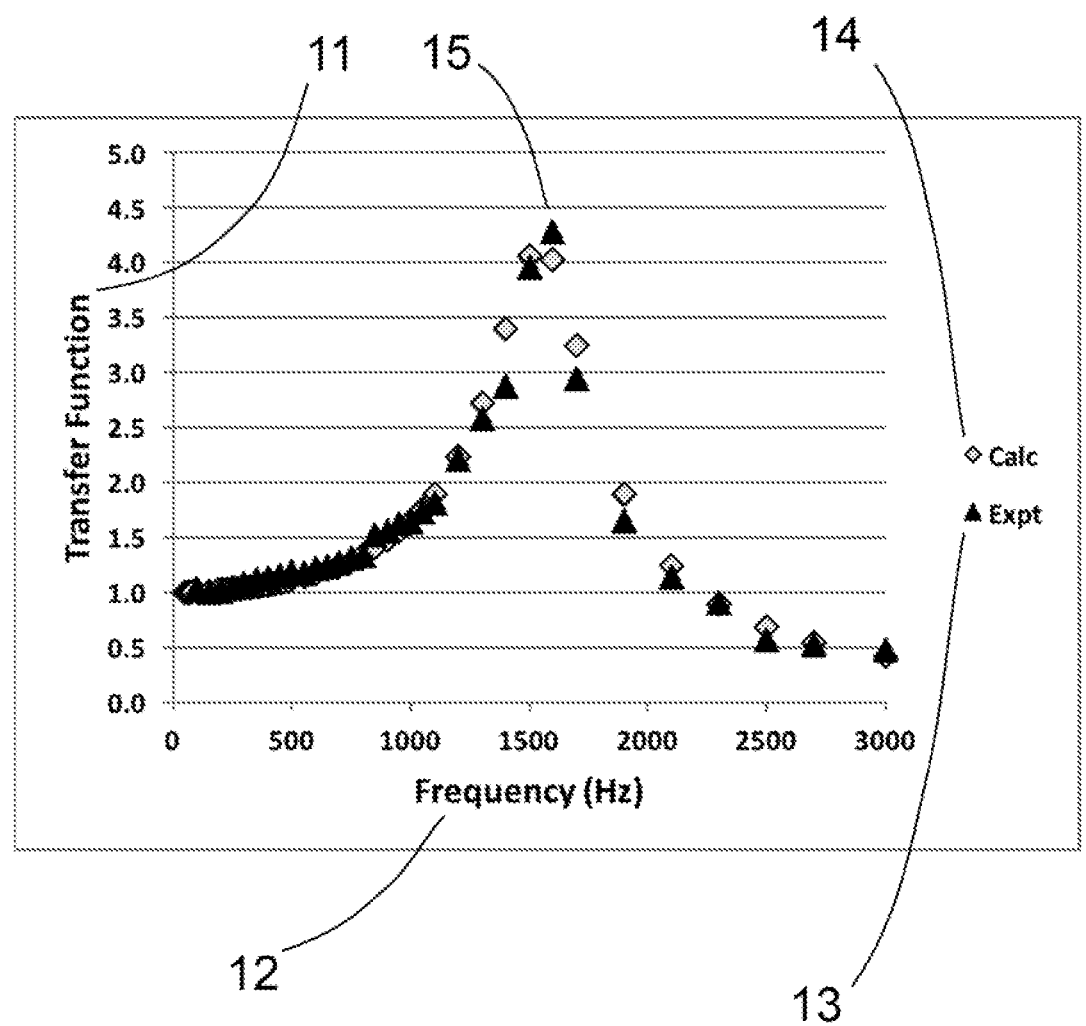
FIG. 1 shows the transfer function of a BNNT mat.

BNNTs have exceptional viscoelastic behavior. This behavior results from BNNT molecules rubbing against one another. The polar boron-nitrogen bonds in BNNTs are partially ionic in character and are believed to produce nanoscale friction that generates phonons in (and between) the BNNT molecules that dissipate the vibration energy as heat. Carbon nanotubes (CNTs) do not exhibit this behavior because their carbon-carbon bonds are non-polar, not ionic, and the carbon atoms of one CNT easily slide against the carbon atoms of another CNT.

BNNTs, and in particular a BNNT material in various configurations such as those disclosed herein, provide enhanced viscoelastic performance. In some embodiments, configurations include a visco-elastically-enhanced BNNT material that comprises one or more of purified BNNTs, aligned BNNTs, isotopically enhanced BNNTs, and density controlled BNNT material. Reducing the amounts of boron particles, a-BN particles, h-BN nanocages, and h-BN nanosheets increases the amount of BNNT surface area present, thereby creating nanotube-to-nanotube friction that generates the viscoelastic behavior. Thus, in some embodiments one or more of boron particles, a-BN particles, h-BN nanocages, and h-BN nanosheets may be minimized or removed from a BNNT material to enhance the BNNT material's viscoelastic behavior. Aligning BNNT molecular strands with each other within the BNNT material also generates enhanced friction surfaces. Thus, increasing the relative alignment of BNNTs within a BNNT material enhances the BNNT material's viscoelastic behavior.

BNNTs may be manufactured by various techniques. For example, BNNTs produced by high temperature or high temperature high pressure methods typically are high quality BNNTs, i.e. the number of walls range from one to ten (with most being two-walled and three-walled), the length-to-diameter ratios are typically ten thousand to one or higher, the BNNTs are catalyst free, and the BNNTs are highly crystalline with very few defects (less than one defect per one hundred diameters of length). However, small particles of boron, amorphous boron nitride (a-BN), hexagonal boron nitride (h-BN) nanocages, and h-BN nanosheets may be present. These small particles are typically tens of nanometers (nm) in scale but may be smaller or larger depending on the manufacturing process. Depending on synthesis conditions, these small particles may account for 5-95 percent of the mass of the as-synthesized BNNT material.

BNNT material has several valuable properties. The density of the as-synthesized high temperature method BNNT material is typically about 0.5 to about 4.0 grams per liter (0.5-4.0 g/L) but easily varies by as much as +/−50%, particularly depending on the synthesis process. The density of the BNNT material may be increased to enhance the BNNT material's viscoelastic properties. For example, a BNNT material may be compressed using techniques known in the art to increase the density by about 1-3 orders of magnitude relative to the density of the as-synthesized BNNT material and in some embodiments beyond this value. For example, a BNNT material may have a density of about 0.5 to about 4.0 g/L after synthesis, and may be compressed until the density is as high as about 1,000 g/L, or higher in some embodiments, to form a visco-elastically-enhanced BNNT material. It should be appreciated by those of ordinary skill in the art that various compression techniques may be used. Examples include, but are not limited to, include flat area compression, forming the BNNT material into yarns and then twisting the yarns to provide both compression and aligned compression in the direction of the yarns, and, in some embodiments, helically around the yarns, and in weaving the yarns into fabrics or other geometries where the compression in one direction can be different from the compression in a second direction. After compression, the BNNT material typically remains close to its compressed shape and density.

Purified BNNT material with most of the boron particles, a-BN particles, h-BN nanocages, and h-BN nanosheets removed has similar densities to the as-synthesized materials, though the maximum density is typically less. The surface area of the as-synthesized high quality BNNT material is typically in the range of 100-200 $m^2/g$ or above, depending on the choice of synthesis parameters. A visco-elastically-enhanced BNNT material may be a purified BNNT material, i.e., a BNNT material that has been processed to remove or reduce at least a portion of boron particles, a-BN particles, h-BN nanocages, and/or h-BN nanosheets.

The stiffness (storage modulus) is an important characteristic of viscoelastic materials. Acting as a damped spring, both the damping and the stiffness of the viscoelastic material are important for different applications. A BNNT material may be formed into a configuration suitable for use as a vibration damper. A BNNT mat is one example. FIG. 1 shows the transfer function 11 of an approximately 200 mg, about 1.0 cm diameter cylindrical purified BNNT mat. BNNT mat in FIG. 1 was assembled through applying about 10 MPa pressure along its axis with a resultant cylindrical height of about 3 mm, experiencing forced oscillations along its axis while supporting a 1.09 kg mass experiencing gravity at room temperature. BNNT material may be purified through processes such as those described in International Patent Application No. PCT/US17/63729, filed Nov. 29, 2017, and incorporated by reference in its entirety. BNNT material may also be shaped into a desired geometry, such as described in International Patent Application No. PCT/US2015/027570, filed Apr. 24, 2015 and incorporated by reference in its entirety. The value of the transfer function 11 varies with frequency 12. The experimental data 13 is compared with a simple harmonic motion calculation 14. The fit of the calculation 14 to the height, width, and position of the peak 15 allows extraction of the loss tangent conventionally referred to as Tan δ and the storage modulus of the cylindrical BNNT mat. For the example shown in FIG. 1, Tan δ is 0.25 and the storage modulus is 4,000 MPa. The larger the value of Tan δ, the more viscoelastic the material is.

Figure 2:
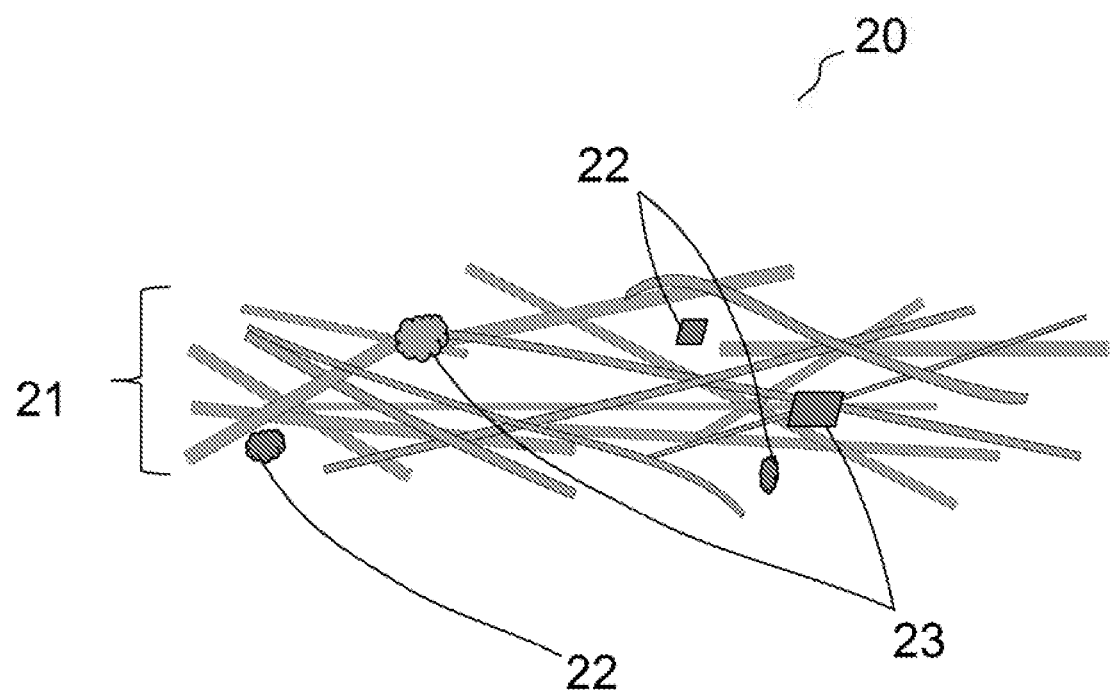
FIG. 2 illustrates a mat composed of BNNT molecular strands including some impurities.

In some embodiments, BNNT material may be synthesized in a variety of formats. Incorporated by reference in their entirety are U.S. Pat. Nos. 9,776,865, 9,745,192, International Patent Application No. PCT/US2015/027570, filed Apr. 24, 2015, and International Patent Application No. PCT/US2016/23432, filed Mar. 21, 2016. High quality BNNT materials, such as those described herein, provide higher performance values for the loss tangent and for control of the storage modulus, at least due to the higher surface area of polar and partially ionic bonds that can generate friction with vibrating. FIG. 2 illustrates BNNT strands 21 and particles of boron, a-BN, h-BN nanocages 22, and h-BN nanosheets 23 compressed into a layer to form a BNNT mat 20. Simple compression of the BNNT material creates some alignment perpendicular to the direction of compression. Minimizing the amount of particles of boron, a-BN, h-BN nanocages 22, and h-BN nanosheets 23 by purification improves the loss tangent, and in some cases may more than double the loss tangent. Some h-BN nanosheets 23 join to BNNTs and may advantageously help maintain the open structure of the compressed BNNT material. Thus, the BNNT material may be synthesized and purified to meet the particular needs of a given embodiment. As an example, variables as observed with Transition Electron Microscopy (TEM) including their number of walls (generally, fewer is better), nanotube bulk diameters (generally, smaller is better) and nanotube crystallinity. U.S. Provisional Patent Application 62/475,602, filed Mar. 23, 2017, is incorporated by reference in its entirety. With respect to number of walls, bulk diameter, and crystallinity, it should be appreciated that those variables may be estimated through visual analysis of TEM imagery. Of course, it should also be appreciated that there may be some variation with respect to the values determined. These may be approximations, and the scope of this disclosure is not intended to be limited to any specific approximation or value unless clearly stated in the appended claims. As a further example, the synthesis process and/or the level and type of purification may be selected to control the amounts of impurities, e.g., to minimize the amount of particles of boron and a-BN, to control the average size and amount of h-BN nanocages (generally, fewer and smaller is better), and to control the average size, amount, and distribution of h-BN nanosheets. For example, the BNNT purification processes such as those described in International Patent Application No. PCT/US17/63729, filed Nov. 29, 2017, and incorporated by reference in its entirety, may be used to reduce the amount of boron particles to below one percent mass of the material. Yields of BNNT material (including BNNT, h-BN nanocages and h-BN nanosheets) of 50-80 percent are typically observed following boron removal. Thus, boron particles may comprise less than 50 percent by mass of a visco-elastically-enhanced BNNT material, and in some embodiments less than 20 percent by mass of a visco-elastically-enhanced BNNT material, and in some embodiments, less than 1 percent by mass of a visco-elastically-enhanced BNNT material. In some embodiments, high quality BNNTs, i.e. the number of walls range from one to ten (with most being two-walled and three-walled), the length-to-diameter ratios are typically ten thousand to one or higher, the BNNTs are catalyst free, and the BNNTs are highly crystalline with very few defects (less than one defect per one hundred diameters of length), will be preferred for the BNNT material.

Figure 3:
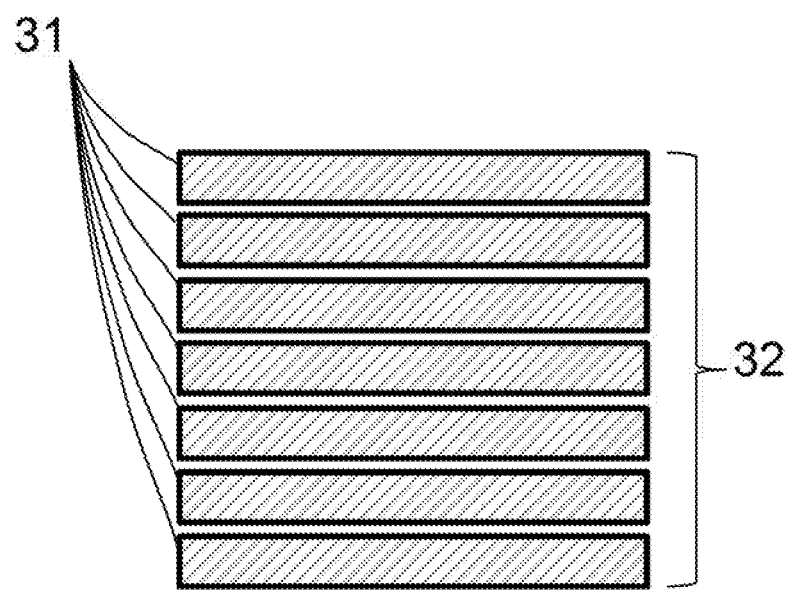
FIG. 3 illustrates multiple BNNT mats stacked to make a larger BNNT mat.

In some embodiments, mats of visco-elastically-enhanced BNNT material may be formed into a desired geometry (e.g., size and shape). A BNNT material may be synthesized into the desired geometry, and/or processed post-synthesis to attain the desired geometry. Methods include, but are not limited to: compression of as-synthesized BNNT material; formation from buckypapers that are made by dispersing BNNT material in a liquid such as an alcohol such as methanol, ethanol or isopropyl alcohol (IPA) and then separating the dispersed BNNT material on to a filter membrane such as those described in International Patent Application No. PCT/US17/63729, filed Nov. 29, 2017; and evaporating a dispersant, such as an alcohol (e.g., IPA), from BNNTs placed in a form, and the several embodiments of forming BNNT yarns and fabrics discussed above. Some embodiments will employ a BNNT mat such as those described in International Patent Application No. PCT/US17/63729, filed Nov. 29, 2017. As illustrated in FIG. 3, multiple BNNT mats 31 may be stacked to create a thicker BNNT mat 32.

Controlling the storage modulus of the final BNNT mat may be important in some embodiments. The length (or height) and cross sectional area of the final BNNT mat determines the spring constant of the mat. The spring constant with the attached mass determines the natural frequency of vibration of the assembly for systems behaving as simple harmonic oscillators. In some embodiments, the assembly processes going into making BNNT mats may be tailored to adjust the storage modulus of the final mat. For example, if high pressures, e.g., pressures over about 10 MPa are used in compressing the BNNT material into the mats, then the storage moduli will be higher. Varying the storage modulus has only a modest effect on the loss tangent for most embodiments, for example, in some embodiments the effect has been less than 50%. Separately, if the visco-elastically-enhanced BNNT material is aligned and/or woven into the desired geometry, the storage moduli may be either raised or lowered depending on the desired geometry. The alignment of the BNNT molecular strands may be achieved as discussed above for BNNT yarns, and in some embodiments the alignments will provide different storage moduli in different directions. For example, if the BNNT strands are on average aligned with, perpendicular or at angles to the direction of vibration, the storage modulus will be effected. The production processes utilized for making high quality BNNT material may also produce some alignment of the BNNTs into BNNT strands, BNNT fibers, and BNNT yarn, such as described in International Patent Application PCT/US15/27570, incorporated by reference in its entirety. Such alignment results from the flow fields in the BNNT self-assembly and post self-assembly regions of the synthesis process. Whether the alignment comes from the production process, a post production purification, chemical treatment and/or dispersion process, a compression process, a spinning and/or weaving process making yarns or fabrics as discussed International Patent Application PCT/US2015/027570, or combinations thereof, the alignment may be utilized to both optimize the loss tangent and create the desired storage modulus. Those of ordinary skill in the art should recognize that these parameters may be varied to achieve the properties desired for a given embodiment.

Figure 4:
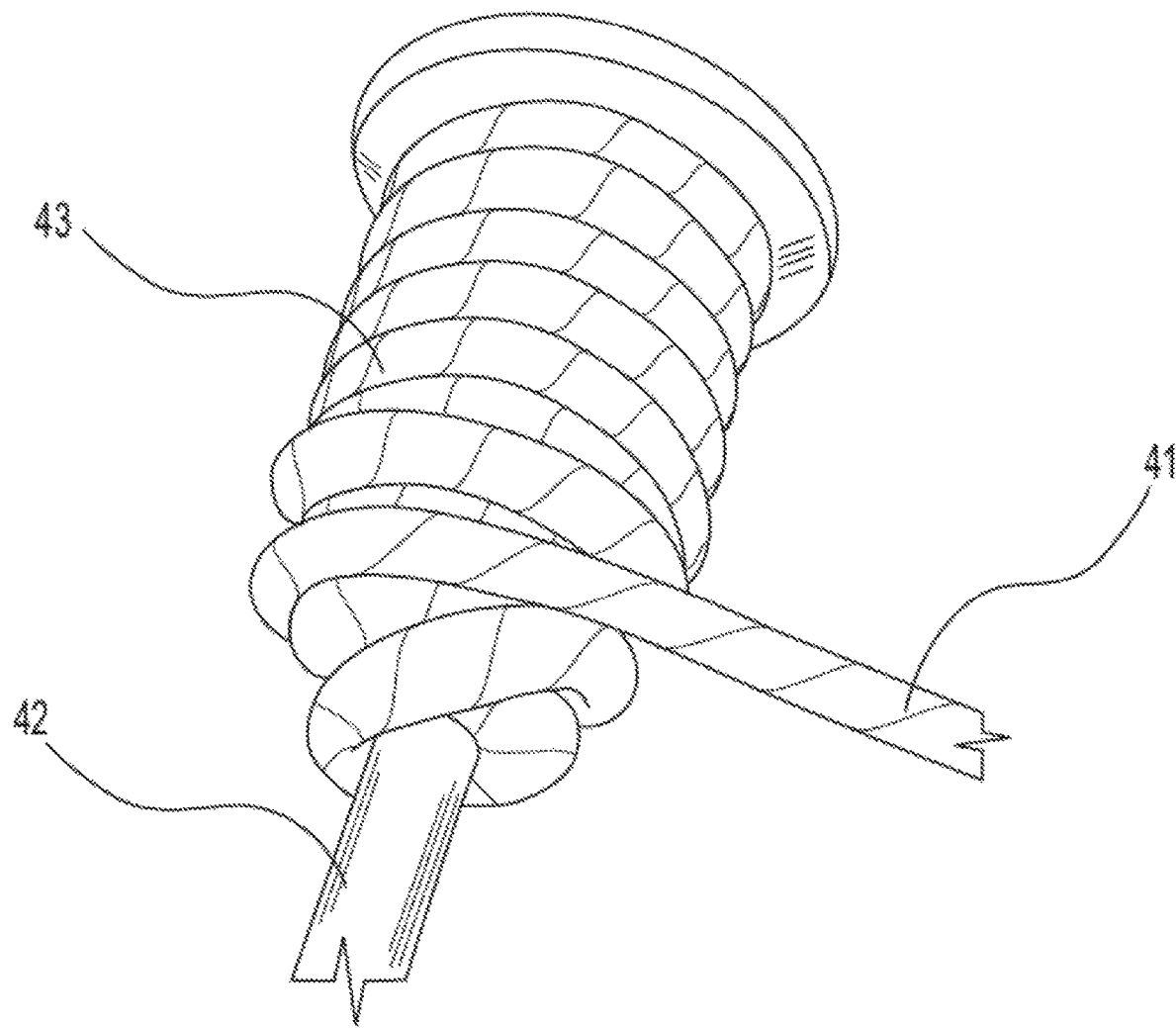
FIG. 4 illustrates a BNNT thread or yarn spooled on a mandrel to make a BNNT cylindrical mat with aligned BNNT molecular strands.
Figure 5:
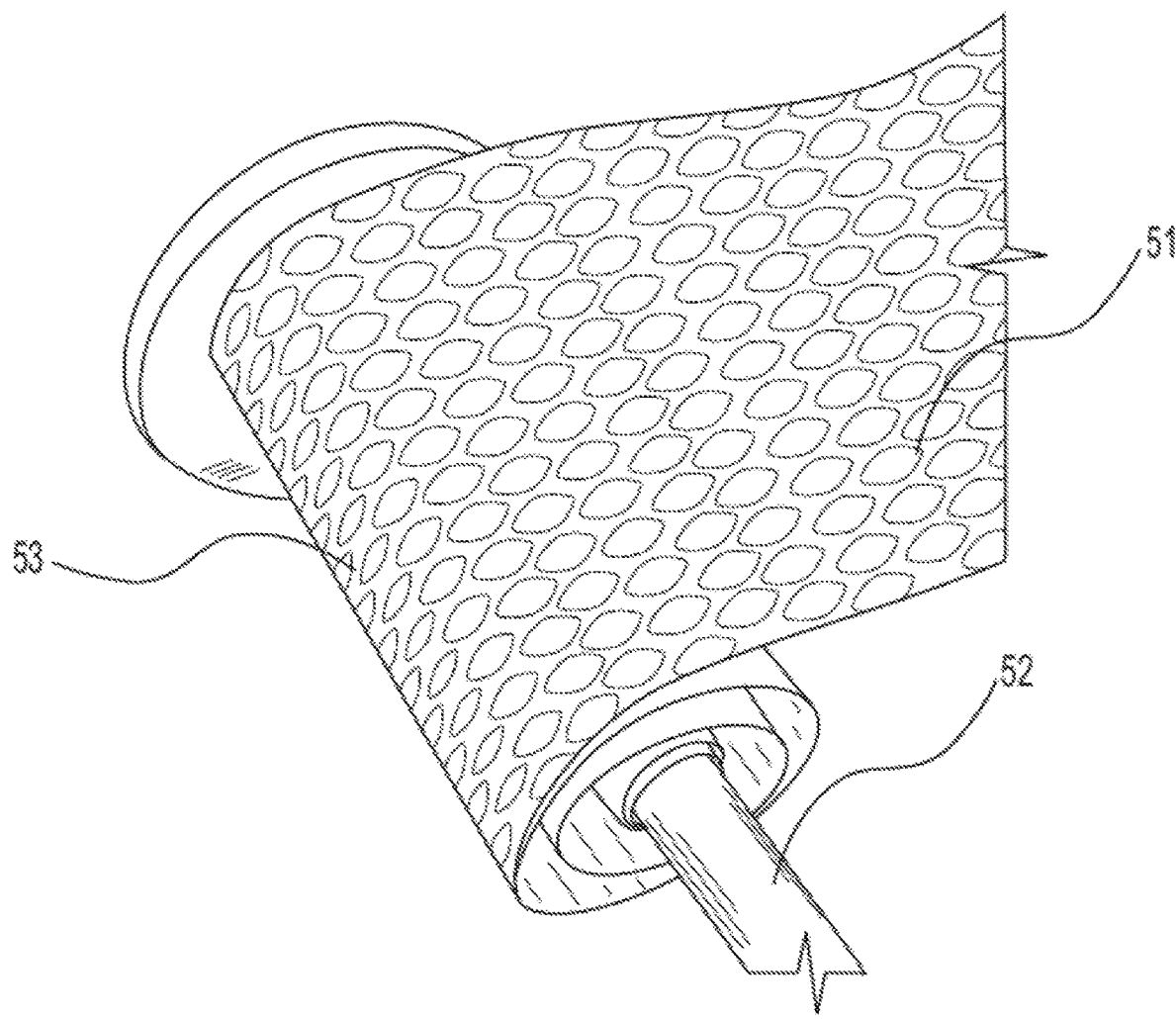
FIG. 5 illustrates a BNNT fabric wrapped on a mandrel to make a BNNT cylindrical mat with aligned BNNT molecular strands.

FIG. 4 illustrates an embodiment for making a visco-elastically-enhanced BNNT material in the form of cylindrical BNNT mat 43. It should be appreciated that the present approach may be used to form different geometries. BNNT material in the form of a thread or yarn 41 is wound around a mandrill 42. The visco-elastically-enhanced BNNT thread or yarn may be made with aligned BNNT material. The BNNT molecular strands that form the BNNT material may be made into threads and multiple threads may be wound into yarns, although in some embodiments the yarns are made directly from the BNNT material, that in turn may be made into ropes, fabrics, etc. The alignment of the BNNT molecular strands may be enhanced with these different forms of BNNT material for different purposes including enhancing the mechanical resilience of the final BNNT mat and enhancing the viscoelastic properties for vibration damping. FIG. 5 illustrates a visco-elastically-enhanced BNNT fabric 51 wrapped around a mandrill 52 to form a cylindrical BNNT mat 53. The alignments of the BNNT molecular strands can be tailored by the directions and amounts of BNNT yarns in a given direction. The selected alignment determines the directional characteristics of the alignment within the fabric, in turn directionally controlling the storage moduli of the resultant material. BNNT threads may be long, i.e. several meters in length, if they are made of BNNT aligned material. Further, the threads may be stiff, i.e. they may droop less than 1 cm for a 10 cm length, if the thread material is compacted to the densities discussed above. Consequently, these stiff threads may be formed into wound and woven structures such as coils around mandrills and fabrics, as discussed above. This process is similar to metals being formed into springs and fabrics. For example, the storage modulus of a steel spring can be orders of magnitude less than the storage modulus of steel itself. This is an additional example of the multiple ways that the storage modus of the BNNT material including aligned BNNT material may be arranged to vary the storage modulus. These three embodiments are meant to serve as examples only, and demonstrate how the alignment of the strands of BNNT may be incorporated into the threads and yarns that make up the BNNT material(s) forming the final BNNT mats. Controlling these alignments and controlling the geometries and pressures utilized in the assembly process may be utilized to optimize the loss tangent and storage modulus of the material for a given vibration damping implementation.

The transport of phonons along the BNNT molecules may be further enhanced by utilizing isotopically-enhanced BNNTs. Separately, both $^{10}$B and $^{11}$B enhancements provide benefits by increasing the loss tangent of the final BNNT mat. A boron feedstock may be selected for BNNT synthesis that contains $^{10}$B and/or $^{11}$B. For example, isotopically enhanced boron is commercially available at 96% for $^{10}$B and 98% for $^{11}$B and can be used for the synthesis of BNNT by the processes discussed above and incorporated herein by reference, as synthesis processes are insensitive to the isotopic content of the boron.

The transport of phonons and the storage modules of the final BNNT mat may also be modified by mixing in non-BNNT material into the final BNNT mat. For example, at the nano and micro scales, nano and/or micro fillers may be introduced into a BNNT material, such as, for example, the BNNT strands 21 illustrated in FIG. 2, and at the macro scale layers of other material may be placed between the mats 31 illustrated in FIG. 3. It should be appreciated that one or more commonly used viscoelastic materials known in the art, such as rubber, amorphous polymers, semicrystalline polymers, biopolymers, metals at very high temperatures, and bitumen materials may be used as a filler. In some embodiments, one or more mats of commonly used viscoelastic material(s) known in the art, may be adjacent to one or more BNNT mats. The behavior of such materials will be consistent over a limited temperature range, though one of ordinary skill in the art can determine an appropriate configuration for a given embodiment. In the examples shown in FIGS. 2 and 3, the loss tangent of the assembly will likely be reduced, but the storage modulus may be changed either up or down as required for a given embodiment. As one skilled in the art will appreciate, there is great flexibility in combining materials to create vibration damping systems.

The viscoelastic behavior of BNNT mats has been observed at temperatures as low as 77 K (liquid nitrogen) and has high as 400 K. Further, BNNT viscoelastic behavior is expected to be present from near absolute zero to the maximum temperatures for BNNT, which is estimated to be in the region of 1900 K. Over the measured region from 77 K to 400 K, the loss tangent of the material is minimally effected by the temperature. Experimental results indicate that BNNT viscoelastic vibration damping is effective for applications at superconducting radio frequencies (SRF), e.g. typically 2 K or 4 K, liquid natural gas (LNG) temperatures, and temperatures experienced in high temperature turbine engines.

Figure 6:
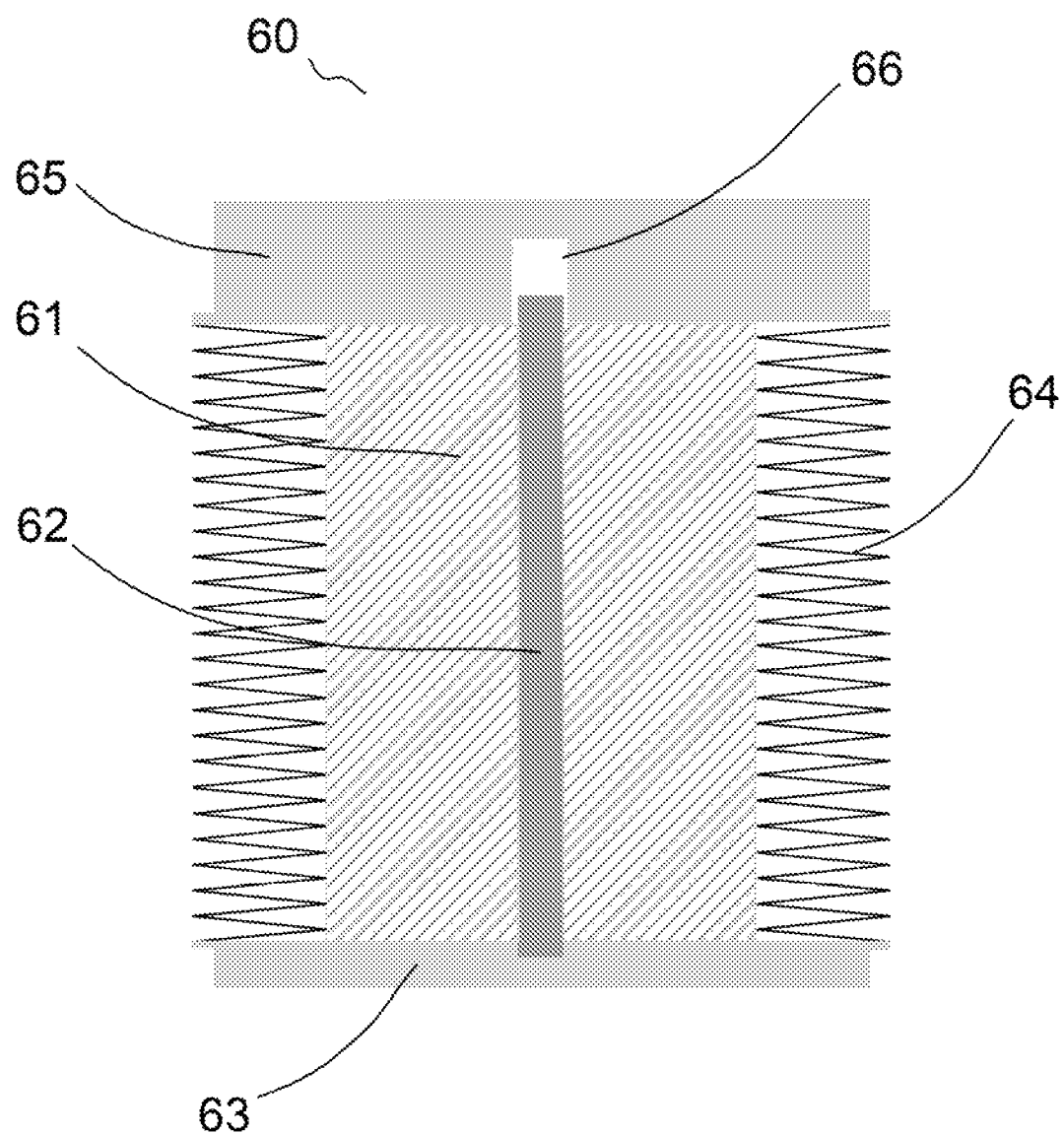
FIG. 6 illustrates an embodiment of a BNNT cylindrical mat within a bellows.

In some embodiments, the visco-elastically-enhanced BNNT material may be encased in a structure that may separate the BNNT material from its environment, such as in SRF, LNG, and gas turbine environments. For example, the BNNT material may be in the form of a BNNT mat, and the application requiring vibration damping may involve solvent flow. FIG. 6 illustrates one embodiment of a cylindrical BNNT mat 61 formed around a mandrill column 62 and supported by the mandrill plate 63. A bellows 64 is placed around the BNNT mat 61 and connected to the mandrill plate 63 and top plate 65. The bellows 64 may be a stainless steel welded bellows but may also be any other material that provides the separation of the BNNT mat from its environment. The mandrill column 62 may freely vibrate within an opening 66 in the top plate 65.

Figure 7:
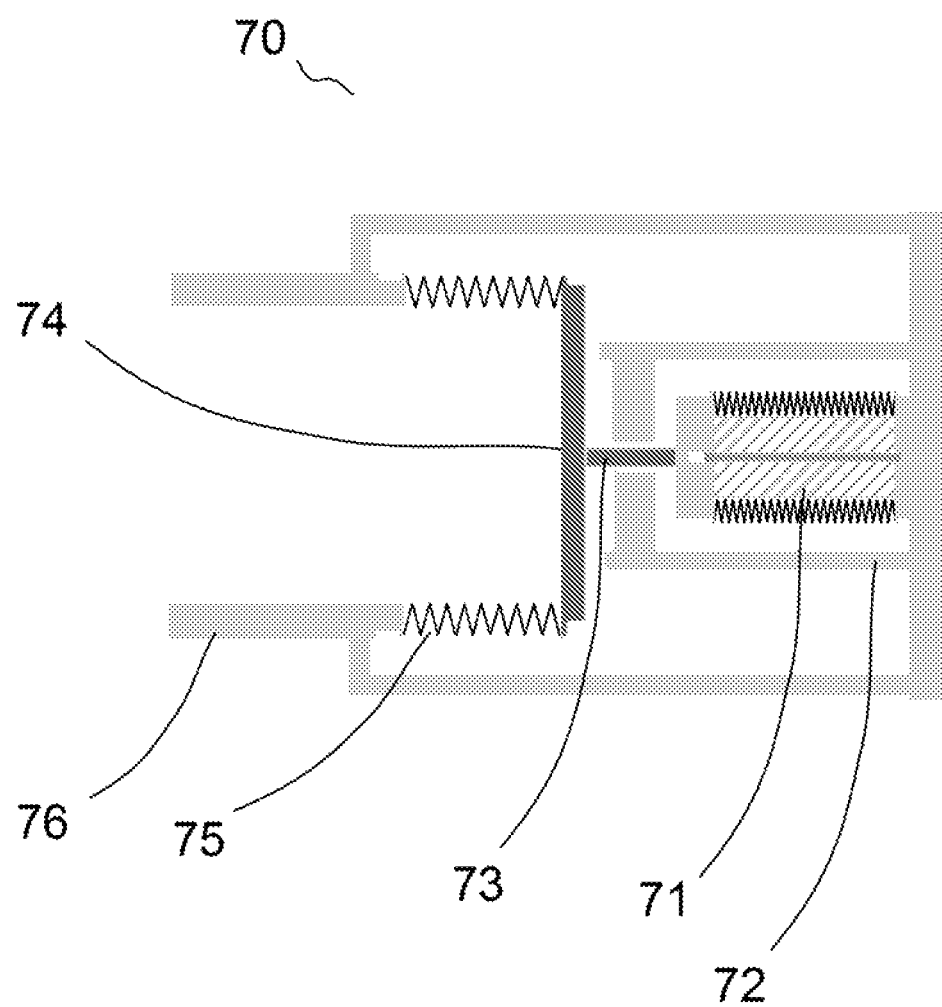
FIG. 7 illustrates an embodiment of a BNNT cylindrical mat with a driving bellows.

In some embodiments, BNNT mats for vibration damping may be incorporated into complex structures. For example, FIG. 7 illustrates the BNNT cylindrical mat 71 from FIG. 6 incorporated into a housing 72 and 76 for vibration damping of a gas pressing on a plate 74. Vibrations from the plate 74 are transmitted to the BNNT cylindrical mat 71 via a sliding rod 73 and a flexible bellows 75. Such an arrangement may be utilized in various applications, such as, for example, in controlling gas vibrations in SRF and LNG cooling facilities. The BNNT mats discussed in the figures are illustrative only. It should be appreciated that the present approach enables a wide variety of configurations. The loss tangent and storage modulus performance of the BNNT mats may be optimized for a given embodiment by optimizing the quality of the BNNT material in the synthesis and purification processes, aligning the material in the synthesis and processing steps, and controlling the assembly processes in the fabrication steps.

Those of ordinary skill in the art should appreciate that embodiments of the present approach may significantly depend on the initial BNNT synthesis process. The BNNT material resulting from a particular synthesis process will have a variety of parameters, ranging from diameter and length averages to impurity content. Such parameters may vary significantly for different synthesis processes. Those parameters, in turn, will likely impact the post-synthesis processing (such as, for example, purification steps, compression and shaping, etc.) that may be appropriate to prepare a BNNT material for a vibration damping embodiment. The examples described herein are provided as demonstrative, and should not be understood as limiting the scope of the present approach.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A BNNT vibration damper comprising:
a cylindrical BNNT mat having a central axis and a diameter perpendicular to the central axis, wherein the cylindrical BNNT mat comprises a BNNT material displaced around the central axis and having a first nanotube alignment in a direction parallel to the central axis, and compressed in a direction parallel to the central axis.

2. The BNNT vibration damper of claim 1, wherein the BNNT material comprises a second nanotube alignment in a direction perpendicular to the central axis.

3. The BNNT vibration damper of claim 1, wherein the BNNT material comprises a BNNT buckypaper.

4. The BNNT vibration damper of claim 1, wherein the BNNT material comprises an enhanced concentration of at least one of $^{10}$B and $^{11}$B.

5. The BNNT vibration damper of claim 1, wherein the BNNT material is formed from an as-synthesized BNNT material and has a compressed density of about 1 to 3 orders of magnitude greater than the density of the as-synthesized BNNT material.

6. The BNNT vibration damper of claim 1, wherein the BNNT material comprises at least one of a BNNT thread, a BNNT yarn, and a BNNT fabric.

7. The BNNT vibration damper of claim 1, wherein the BNNT material comprises a plurality of at least one of a BNNT thread, a BNNT yarn, a BNNT mat, and a BNNT fabric.

8. The BNNT vibration damper of claim 1, further comprising a second cylindrical BNNT mat in a stack with the cylindrical BNNT mat.

9. The BNNT vibration damper of claim 1, wherein the cylindrical BNNT mat exhibits viscoelastic behavior from 77 K to 400 K.

10. The BNNT vibration damper of claim 1, wherein the BNNT material comprises boron particles of less than 50% by mass of the BNNT material.

11. The BNNT vibration damper of claim 1, wherein the BNNT material comprises boron particles of less than 20% by mass of the BNNT material.

12. A BNNT vibration damper comprising:
a cylindrical BNNT mat having a central axis and a diameter perpendicular to the central axis, wherein the cylindrical BNNT mat comprises a BNNT buckypaper displaced around the central axis and having a first nanotube alignment in a direction parallel to the central axis, and compressed in a direction parallel to the central axis.

13. The BNNT vibration damper of claim 12, wherein the BNNT buckypaper comprises a second nanotube alignment in a direction perpendicular to the central axis.

14. The BNNT vibration damper of claim 12, wherein the BNNT buckypaper comprises an enhanced concentration of at least one of $^{10}$B and $^{11}$B.

15. The BNNT vibration damper of claim 12, wherein the BNNT buckypaper is formed from an as-synthesized BNNT material and has a compressed density of about 1 to 3 orders of magnitude greater than the density of the as-synthesized BNNT material.

16. The BNNT vibration damper of claim 12, further comprising a second cylindrical BNNT mat in a stack with the cylindrical BNNT mat.

17. The BNNT vibration damper of claim 12, wherein the cylindrical BNNT mat exhibits viscoelastic behavior from 77 K to 400 K.

18. The BNNT vibration damper of claim 12, wherein the BNNT material comprises boron particles of less than 50% by mass of the BNNT material.

19. A BNNT vibration damper comprising:
a cylindrical BNNT mat having a central axis and a diameter perpendicular to the central axis, wherein the cylindrical BNNT mat comprises a BNNT buckypaper displaced around the central axis and having a first nanotube alignment in a direction parallel to the central axis and a second nanotube alignment in a direction perpendicular to the central axis, and compressed in a direction parallel to the central axis.

20. The BNNT vibration damper of claim 19, wherein the BNNT material comprises boron particles of less than 50% by mass of the BNNT material.

* * * * *